(12) United States Patent
Mueller (10) Patent No.: US 7,788,026 B2
(45) Date of Patent: Aug. 31, 2010

(54) METHOD AND NAVIGATION SYSTEM FOR DETERMINING ROUTES TO A PLURALITY OF FINAL DESTINATION POINTS

(75) Inventor: Guido Mueller, Quedlinburg (DE)

(73) Assignee: Robert Bosch GmbH, Stuttgart (DE)

( * ) Notice: Subject to any disclaimer, the term of this patent is extended or adjusted under 35 U.S.C. 154(b) by 1106 days.

(21) Appl. No.: 10/486,482

(22) PCT Filed: Aug. 8, 2002

(86) PCT No.: PCT/DE02/02918

§ 371 (c)(1),
(2), (4) Date: Sep. 9, 2004

(87) PCT Pub. No.: WO03/016823

PCT Pub. Date: Feb. 27, 2003

(65) Prior Publication Data

US 2005/0090975 A1     Apr. 28, 2005

(30) Foreign Application Priority Data

Aug. 10, 2001   (DE) ................................ 101 39 549

(51) Int. Cl.
*G01C 21/26* (2006.01)

(52) U.S. Cl. ...................... 701/201; 701/208; 701/209; 701/210; 701/211; 340/988; 340/990

(58) Field of Classification Search .................. 701/209, 701/208, 210, 211, 201; 340/988, 990, 995

See application file for complete search history.

(56) References Cited

U.S. PATENT DOCUMENTS

| 4,984,168 | A | | 1/1991 | Neukrichner et al. |
| 5,608,635 | A | * | 3/1997 | Tamai ........................ 701/209 |
| 6,230,099 | B1 | * | 5/2001 | Fabian ........................ 701/209 |
| 6,567,743 | B1 | * | 5/2003 | Mueller et al. .............. 701/209 |

FOREIGN PATENT DOCUMENTS

| DE | 198 36 485 A1 | 2/2000 |
| DE | 199 03 909 A1 | 8/2000 |
| DE | 199 28 295 A1 | 12/2000 |
| WO | WO 88/09974 | 12/1988 |

* cited by examiner

*Primary Examiner*—Khoi Tran
*Assistant Examiner*—Nikhil Sriraman
(74) *Attorney, Agent, or Firm*—Kenyon & Kenyon LLP (57) ABSTRACT

A method for ascertaining routes in a route network is provided, in which an optimal route to a target of a certain category can be determined. A route is calculated from a point of origin to an optimal target point from a plurality of spatially separated target points that are allocated to at least one directed segment and/or to at least one node. The method includes defining the target points from entries of addresses, map targets, target memory entries given by an index of a given category, such as, for instance, post office, gas stations. The respective route to the target point is optimized as a sequence of the directed segments having nodes situated between the directed segments such that the sum of all resistances of the sequence to the respective target point becomes a minimum. A list of the respective routes to the respective target point is then drawn up.

13 Claims, 8 Drawing Sheets

METHOD AND NAVIGATION SYSTEM FOR DETERMINING ROUTES TO A PLURALITY OF FINAL DESTINATION POINTS

FIELD OF THE INVENTION

The present invention relates to a method for ascertaining routes in a route network, for example, a road network, that is mapped as directed segments and nodes situated between the directed segments in a memory unit. According to the method of the present invention, the route to be ascertained may be determined as a sequence or series of directed segments having nodes between the directed segments wherein a specific resistance may be allocated to each directed segment and/or each node. The present invention further relates to a navigation system related to such a method.

BACKGROUND INFORMATION

In currently-deployed navigation systems, the driver of a vehicle, such as a motor vehicle, can influence the route traveled in various ways, e.g., as described in published European patent document EP 0 979 987. For instance, the driver may select different optimizing criteria, such as "short route", "fast route", "avoid expressways" or the like, and/or can influence route sections, determined manually or using traffic telematics, which are then favored or avoided in the route calculation. The driver may also define one or more intermediate targets, which are then approached in sequence leading to a final target.

However, before searching for the route, the driver has to commit himself to an intermediate target which has to be a firm intermediate target. Thus, the intermediate targets or targets may essentially be divided into the following categories:
   a road target given by one or more road sections that are connected to one another;.
   road crossing target given by a target point which is established by the crossing of roads having different names;
   directed point target or non-directed point target given by a target point which is mapped onto an orthopole on a nearby road section.

However, the various target types mentioned above have in common that all the targets relate spatially to one enclosed region.

In some cases, there may be a desire on the part of the driver to be offered an optimum route to any one of several targets. For example, a driver may be looking for the nearest parking lot in a town that is unknown to him or may need a route to the nearest gas station, because his tank contents are low; alternatively, the route to the nearest branch of a fast food chain may be desired.

In the current navigation systems, the various applicable targets are shown in an index with a brief description. The user of the navigation system then can select one of these targets from the index and have a route determined. The index list in some conventional navigation systems, besides having a simple description, may also include a pertinent linear distance, and is sorted according to this linear distance.

In such cases, the nearest target from the current position can be very simply determined using the criterion of linear distance. However, in actual topography examples may be found in which these targets are not easy to reach from the current location of the means of locomotion, or rather, there are equivalent or even better alternative targets. Consequently, "nearest . . . " does not necessarily mean the nearest target, but the target that is most easily reached.

In such current navigation system, the optimal target is ascertained by consecutive calculations of routes to all the targets offered in the index and by comparison of the same; this is a time-consuming and difficult process even when only the nearest three targets with regard to linear distances are to be considered.

After the user of a navigation system has decided on a target, then, this target is maintained. If it is not possible to follow the suggested route to the selected target, whether because of simply departing from the route and/or on account of road closings, the driver continues with the old target despite the fact that there may be a better target. This may lead to inefficient results. For example, it is possible that a route to a selected gas station may directly pass another possible gas station, which, at the start of the navigation, had seemed less favorable.

In order to implement a method according to the type described above a route network, such as a road network, is mapped by a digital map. According to an example implementation, a route-search algorithm according to Ford and Moore may be used. For this algorithm, the following criteria for imaging the route network may be used:

A route network, in particular a road network, can be depicted using a route-search algorithm as a graph having segments and having nodes. In this connection, the segments represent the routes and the nodes represent the interconnection points of the route network. Since in an actual road network traffic flow has direction, a segment is described with a vector having direction (See FIG. 1 which depicts an exemplary route network as a network of directed segments and of nodes situated between the directed segments).

Travel resistances or "segment resistances", are allocated to the segments, where each segment resistance represents a measured variable for the effort of getting from one node in the network to another node in the network. In the simplest case, the length of the segment can be used directly as the segment resistance. Alternatively, making the assumption of an average traffic speed, the travel time on a segment may be regarded as its segment resistance; however, configurations are also conceivable in which travel time, length and other variables are linked with one another, in order to view the segment resistance of a map in a graph.

In addition, it may be noted at this point, that a resistance may also be allocated to the nodes.

All optimal path algorithms determine a route between a starting segment and a target segment in the directed graph having the property that the sum of all segment resistances allocated to the segments has a minimum. An algorithm for route calculation may build upon known optimal method algorithms according to Ford and Moore taken from graph theory; in this connection, these algorithms are adapted to the requirements for use in autonomous vehicle navigation systems.

The algorithm according to Ford and Moore is reverse-iterating, i.e., "visits" all the segments in the graph and evaluates the segments with respect to their favorable resistance to the target segment. This means, in other words, that, starting from a target segment, in each iterative step, the most favorable path is sought with respect to resistance, to the segments cited in a list and optimized in the previous iterative step. As a result, the method supplies the optimal route to the target segment from each segment in the graph.

To represent the calculation results, a route table is installed in the memory unit, which may appear as follows for an exemplary network according to FIG. 1:

| Segment | +Resistance | +Successor | −Resistance | −Successor |
|---------|-------------|------------|-------------|------------|
| k1 | ∞ | − | ∞ | − |
| k2 | ∞ | − | ∞ | − |
| k3 | ∞ | − | ∞ | − |
| k4 | ∞ | − | ∞ | − |
| k5 | ∞ | − | ∞ | − |
| k6 | ∞ | − | ∞ | − |
| k7 | ∞ | − | ∞ | − |
| k8 | ∞ | − | ∞ | − |
| k9 | ∞ | − | ∞ | − |

For each segment k1 through k9 in the graph, in this table, the resistance up to the target segment and the successor segment (="successor") in the target direction is stated. As an initial value, the resistance is set to "infinity" (∞) and the successor segment is set to "indefinite" (−), that is, the successor is deleted; a positive sign ("+") in the resistance column and the successor column stands for viewing the segment in its arrow direction, and a negative sign ("−") stands for viewing the segment counter to its arrow direction.

Before the start of the iterative optimization, the target segment in the above route table is initially given a resistance value of "zero"; in addition, the target segment is entered in the list of the already optimized segments, denoted as "first list" below. A "second list" is used for storing the segments to be tested in the next optimization step; at the beginning of the iterative optimization, the second list is empty.

After the initiation, the optimization method may begin. The segments shown in the first list are regarded as being the "actual" position of the vehicle, and all the segments interconnected with this actual segment, the so-called "arriver segments", are submitted to an optimization test (designated by an O below). This yields the scenario illustrated in FIG. 2.

Figure 2:
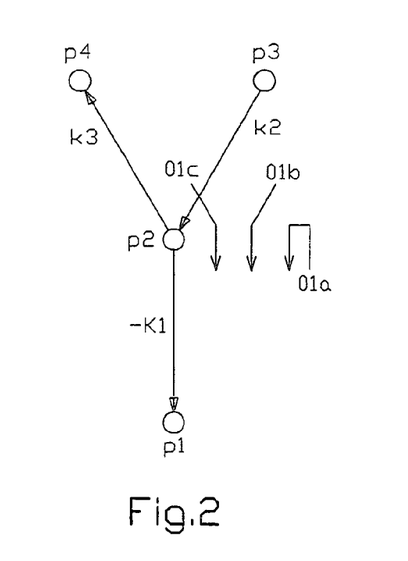
FIG. 2 shows an exemplary optimization of the segments at the node.

It is now assumed for the purposes of optimization that the vehicle is located on one of arriver segments, having a travel direction towards the actual segment. It is then tested as optimization condition whether the previous available route of the arriver segment is worse than the new route while using the actual segment; if the route via the actual segment proves to be better, an optimization is carried out. Corresponding to the configuration shown in FIG. 2, the following optimization relationships are derived:

| Optimization | Actual Segment | Arriver Segment |
|--------------|----------------|-----------------|
| O1a | +k1 | −k1 |
| O1b | +k1 | +k2 |
| O1c | +k1 | −k3 |

For each actual arriver relationship according to the above table, there takes place the optimization testing which is shown by the example of arriver segment +k2 (→optimization O1b; see FIG. 2). In the optimization testing, the previous route table resistance of the arriver segment +k2 to the target is compared to the resistance which the arriver segment would have if it led to the target via the actual segment.

Optimization takes place if the so-called (resistance) optimization condition $$R_{RT,actual(+k1)} + R_{segment,Ank(+k2)} < R_{RT(Alt),Ank(+k2)}$$

is satisfied, where $R_{RT,actual(+k1)}$=resistance (from route table RT) of actual segment +k1 to the target;

$R_{segment,Ank(+k2)}$=segment resistance of arriver segment +k2;

$R_{RT(Alt),Ak(+k2)}$=resistance (from route table RT) of arriver segment +k2 to the target.

The above optimization condition thus means, in other words, that the new resistance of the arriver segment is less than the previous resistance of the arriver segment. The resistance of the arriver segment is then replaced by the new, lower value in the route table, the actual segment is entered as the successor segment, and the optimized arriver segment is taken up into the second list.

If, in this manner, all the segments from the first list have been processed, the first list and the second list are exchanged; this means that the starting point for the next optimization is the segments optimized in the last method step. The method is ended when the first list is found to be empty, that is, when there are no longer any segments optimized in the previous pass.

Figure 1:
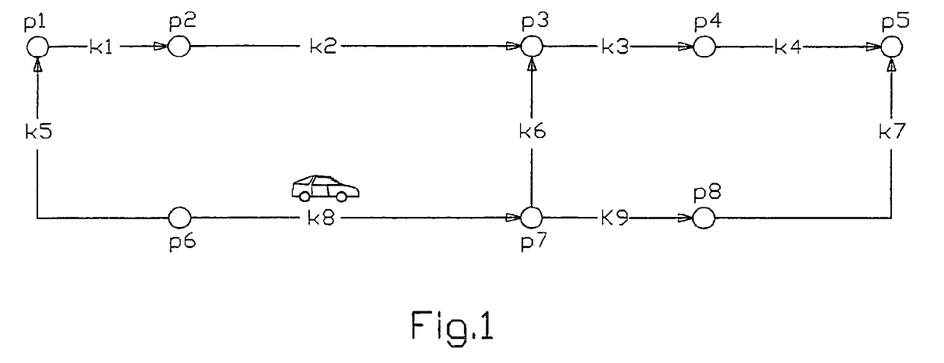
FIG. 1 shows an exemplary route network, especially a real road network, as a network of directional segments and nodes situated between the directional segments.

We shall now explain the problem of a suboptimal route to the next target, in the light of an example:

The exemplary network to be considered is shown in FIG. 1. The assumption is made that segments k1, k3, k4, k6 as well as k9 each have the resistance value 10, and segments k2, k5, k7 as well as k8 each have the resistance value 20. At the time of consideration, the vehicle is located on segment +k8, i.e. the travel direction corresponds to the preferential direction.

The driver of the vehicle, starting from his actual position, would now like to have calculated for him the optimal route to a target of a certain category (this could be, for example, the first post office that comes along, or the first gas station, when the tank reserve of gasoline has already been activated). For this the driver of the vehicle calls up the index of the corresponding category (post offices, gas stations, . . . ) and receives the following list of the particular targets of that category that are located close to the actual position of the vehicle:

| | |
|---|---|
| >20 | target A |
| 30 | target B |

Figure 3:
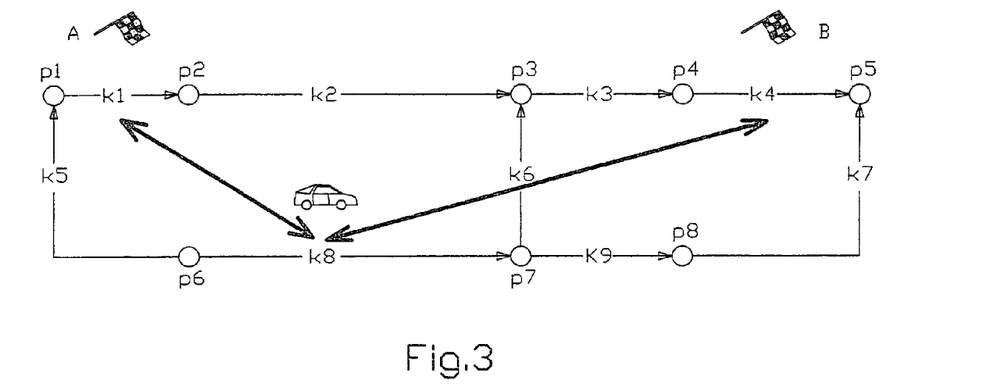
FIG. 3 shows the two partial targets A and B, as well as their respective distance from the vehicle, in the exemplary network as shown in FIG. 1.

This list does not indicate which of the two targets A or B the better route is derived; on this matter, the linear distance between the actual position of the vehicle and individual targets, contained in the index list does not indicate this either. In the exemplary network of FIG. 1, target A is mapped on segment k1 and target B is mapped on segment k4, as may be seen in FIG. 3 in the light of a double arrow, one in each case.

Figure 4:
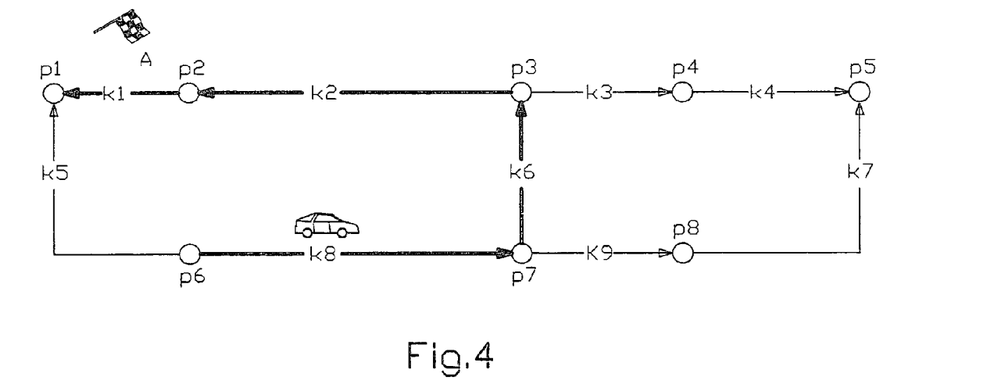
FIG. 4 shows an exemplary route of the vehicle to partial target A.

On the basis of the above list, an initial preference would be for target A which is closer to the actual position of the vehicle. By applying the best path algorithm according to Ford and Moore, as well as by applying the corresponding optimization condition with respect to the resistance, there is derived, as shown in FIG. 4, the route to target A marked by the direction of the arrow, the overall resistance of the route to target A being exactly 50 units.

Figure 5:
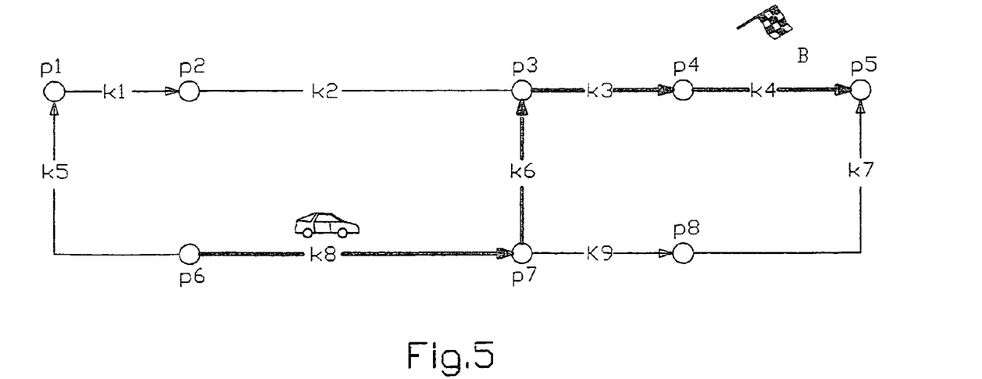
FIG. 5 shows an exemplary route of the vehicle to partial target B.

When determining the route from the actual position of the vehicle to target B, that lies at a greater distance from it, the actual difficulty becomes clear because, for this target B, the route shown in FIG. 5, marked by the direction of the arrows, has a total resistance of 40.

When comparing the two routes to target A and to target B, it becomes clear that the route to the nearest-lying target A does not produce the optimal route; the optimal route, in this example, is to the second-nearest target B. It is particularly a problem, in this connection, that the question as to which target produces the optimal route can be determined, using the conventional methods, only by successive calculations of the routes to all targets.

SUMMARY

Regarding the disadvantages and shortcomings named above, an object of the present invention is to provide a user of a navigation system both the possibility of calculating a route from a starting point to a single target point and also to determine an optimal route to a target of a certain category.

In this connection, one of ordinary skill in the field of traffic telematics will particularly appreciate that, according to the teachings of the present invention, no sequential determination of the routes to the various possibilities takes place, but rather, within the scope of a so-called "Multi-Destination Route Search" the simultaneous consideration of all targets that come into consideration takes place, so that the optimal route to the best target is ascertained as the result.

In this connection, the targets considered in the so-called "multi-destination route search" are assumed to have an equal chance to be selected. In the case of these targets, the various entries of the index of a certain category of special targets, such as post offices, gas stations or the like may be involved; however, alternatively, or in addition, it is also possible to use various targets, which do not originate from a definite index category, for the MultiDestination Route Search. Thus, for example, addresses, map targets or entries from at least one target memory may be used.

According to one embodiment of the present invention, in the MultiDestination Route Search, several targets that are not spatially connected may be used as having equal rights for the route search. In this connection, the driver of the vehicle does not have to ponder which of the targets is easiest to reach, because the route determination from the current actual position to the targets takes place in such a way that the optimal route is ascertained while the selected criteria, such as, for example, "short route", "fast route", or the like, are considered.

After determination of the optimal route to a target, the driver of the vehicle has the choice
- of maintaining the target, of specifying it, or rather discarding the other possible targets;
- of discarding the current target and determining a route to another target;
- of leaving all targets active, so that a better route is derived when departing from the suggested route to another target.

Besides the selected criteria explained above, in the ascertainment of the route according to the present invention, network influences by telematics or by user-specified manipulations may be considered, such as, for example, a "traffic jam ahead" road closing.

For the MultiDestination Route Searches, besides adaptations in the route search itself, expansions in the interface unit of the processing unit of the navigation system according to the present invention and/or in the index for the definition of the equally entitled targets to be used are provided. In this connection, besides data on the starting position required for a normal route search, which may be known to the route search with the aid of the position-finding unit of the navigation system, in the so-called MultiDestination Route Search the various targets having equal parameters are to be specified.

According to an exemplary embodiment of the navigation system of the present invention, input may be manual and/or automatic input. The automatic input may be based on an automatic determination of the current position of the vehicle.

For example, one may work with the still available residual distance in view of the current tank charge, so that then, within the scope of the so-called MultiDestination Route Search (RS) one or more possible routes from the starting point (for example, the current position of the vehicle) to a plurality or multiplicity of equally entitled, spatially separated target points (for example, the gas stations that may still be reached with the current tank charge) may be calculated.

Thus, the actual MultiDestination RS may take place after the definition, described below, (manual or automatic) of a "MultiDestination List" (also called "MultiDest List" below):

The partial targets, also denoted as so-called "subdestinations" (abbreviated as SD), of the so-called MultiDestination RS, may, for example, be targets from the target memory, addresses, location targets or point targets. In the case of this type of target, the user calls up the various targets and stores them manually via a menu option, instead of beginning the route calculation, in the MultiDest List.

Figure 6:
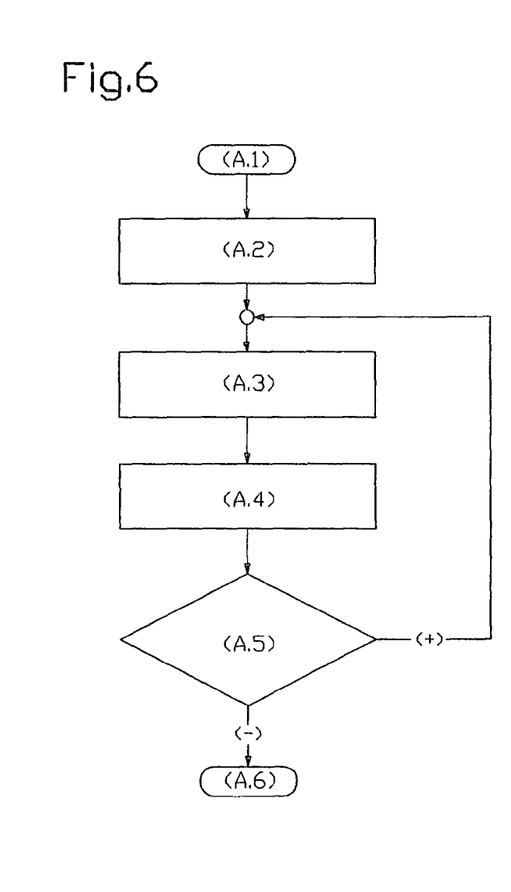
FIG. 6 shows an exemplary procedure of generating a MultiDest List from the individual targets.

According to one example embodiment, the procedure of generating the MultiDest List from the individual targets has the following method steps (shown in FIG. 6):

(A.1) starting;
(A.2) initiating the "MultiDest List";
(A.3) selecting a certain target, such as an address, map target, target memory entry or the like;
(A.4) copying the description of these targets into the "MultiDest List" (in the graph);
(A.5) adding at least one further target:
  if at least one additional target is added (+), then return to before step (A.3);
  if no additional target is added (−), continue to step (A.6),
(A.6) end of the method.

An alternative or supplementary possibility may be to fill the MultiDest List with the entries of the list of special targets of the desired category (post offices, gas stations or the like) near the actual position of the vehicle; in doing this, the number of entries of the MultiDest List is only limited by the finiteness of the working memory of the navigation system. In this case, the user does not select a certain target from the list, but specifies all entries as partial targets; however, it is also possible to add single entries to the list of a MultiDest List.

Figure 7:
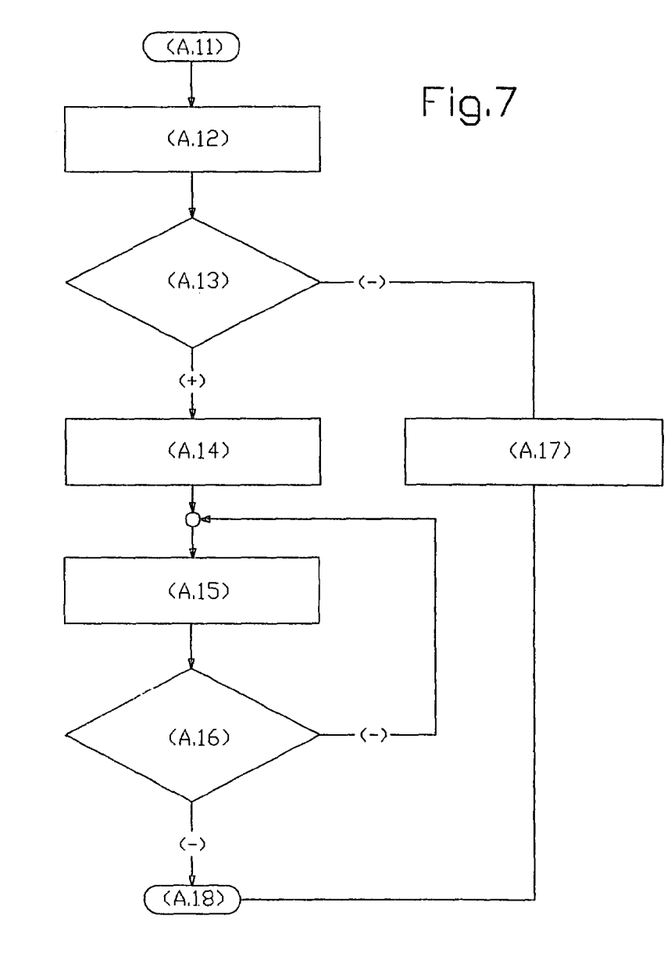
FIG. 7 shows an exemplary procedure of generating the a MultiDest List from a special target list.

According to another embodiment, the procedure of generating the MultiDest List from a special target list has the following method steps (as shown in FIG. 7):

(A.11) starting;
(A.12) selecting the category, especially the special target category;
(A.13) taking over the list as the MultiDest List:
  if the list has been taken over as the MultiDest List (+), go to step (A.14):
  initiate the so-called "MultiDest List";
  if the list has not been taken over as the MultiDest List (−), go to step (A.17): select a certain target;
(A.15) copying the target description into the MultiDest List (in the graph);
(A.16) processing all targets or a certain number of targets:
  if all targets or the certain number of targets have been processed (+), go to step (A.18);
  if not yet all targets or not yet the certain number of targets have been processed (−), go ahead of step (A.15); (A.18) end of method.

Figure 8:
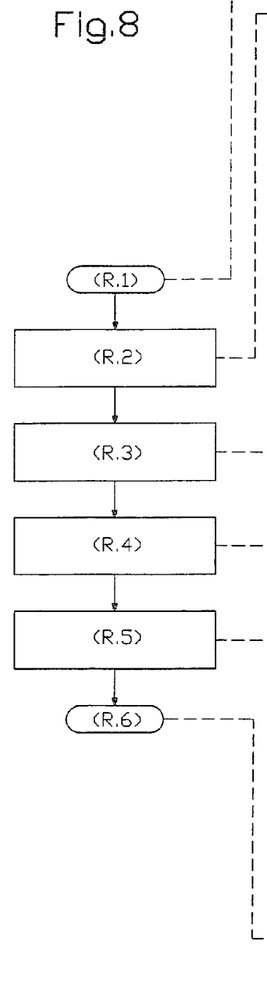
FIG. 8 shows a general sequence of the so-called MultiDestination Route Search (RS) according to the present invention.
Figure 9:
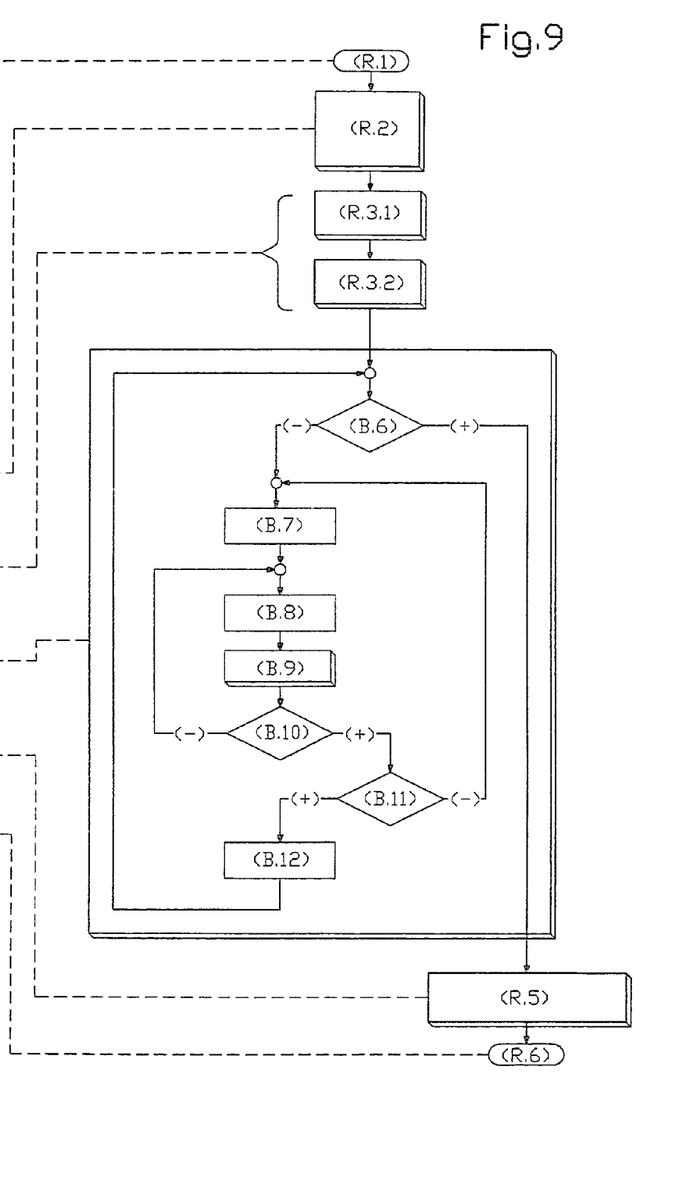
FIG. 9 shows a sequence of the MultiDestination RS in detailed form.

After all partial targets have been defined in this manner, the subsequently described MultiDestination RS may be started using the desired criteria. In this connection, the general sequence of the MultiDestination RS may be subdivided, in an expedient manner, into the following sections shown in FIG. 8 and FIG. 9 using the route search algorithm according to Ford and Moore:

(R.1) starting;
(R.2) determining the MultiDest List specifying two partial targets A and B;
(R.3) initiating:
  (R.3.1) initiating route table: basic initiation of the route table; in this connection, the resistance is set to infinity (¢) and the successor is deleted (–);
  (R.3.2) initiate the segments of the partial targets described in the MultiDest List. After the basic initiation of the route table, all segments of the partial targets to be considered are initiated in the route table; for this purpose, in the route table the resistance is set to "zero" and the successor is set to the initiation value (no successor: "–") of the segments entered in a MultiDest Description List; in addition, the processed segments are taken up into the second list, i.e., into the list of segments that are still to be optimized.
(R.4) Optimization of the segments of the graph: After the initiation of the route tables and of the MultiDest Description List. The actual route search takes place; in the light of the optimization conditions or optimization rules shown below, optimization of the route is performed, as may be seen in FIG. 10.
  (R.4.1) starting of the segment optimization;
  (R.4.2) determining whether $R_{RT(new),Ank} < R_{RT(Alt),Ank}$
    where $R_{RT(new),Ank} + R_{segment,Ank} + R_{RT,actual}$
    if the condition $R_{RT(new),Ank} < R_{RT(Alt),Ank}$ is satisfied (+), go to step (R.4.3): update entry in the route table: update the resistance value of the arriver segment in the route table and enter the actual segment as successor;
    if the condition $R_{RT(new),Ank} < R_{RT(Alt),Ank}$ is not satisfied (–), go to step (R.4.4): end segment optimization.

The sufficient condition for the optimization is demonstrated by the formula $R_{segment,Ank} + R_{RT,actual} < R_{RT(Alt),Ank}$, i.e., the segment must be optimized if the sum of the path resistance of the arriver segment and the resistance of the actual segment that is entered in the route table is less than the previous resistance of the arriver segment that is entered in the route table. Upon satisfaction of this condition, the need for an optimization arises; the new properties of the arriver segment are entered in the route table and as successor the actual segment. If all the segments from the first list used for storing the already optimized segments have been processed in the method described, the first list of the already optimized segments and a second list needed to store the segments to be tested in the next optimization step are exchanged, that is, the point of departure for the next optimizations is the segments optimized in the last method step. The method is terminated when the first list is found to be empty.

(R.5) Drawing up the route list:
  After the completed optimization, the route list is generated from the route table. Starting from the segment of the current position of the vehicle, the segments are written into the route list corresponding to the successor concatenation in the route table. With the aid of the last segment in this route list, the current partial target may be determined via the MultiDest Description List, and may be characterized in a MultiDest Index List for possible location.
(R.6) end of the method.

According to an embodiment of the present invention, in the case of the MultiDestination-RS, based on the optimal path algorithm according to Ford and Moore, at least one route table gets to be used for describing the characteristics of the segments of the graph. Such a route table includes the description of the characteristics of all segments of the route network with respect to a section of the route to the target; each segment is mapped by an entry which includes the characteristics of the segment both in the direction of the arrow and counter to the direction of the arrow.

In the so-called MultiDestination-RS, the optimal route to the best possible target is described in a single route table, the construction of a basically initiated route table being expediently as follows:

| Segment | +Resistance | +Successor | –Resistance | –Successor |
|---------|-------------|------------|-------------|------------|
| k1      | ∞           | –          | ∞           | –          |
| k2      | ∞           | –          | ∞           | –          |
| k3      | ∞           | –          | ∞           | –          |
| ...     | ∞           | –          | ∞           | –          |
| k(M – 1)| ∞           | –          | ∞           | –          |
| kM      | ∞           | –          | ∞           | –          |

According to one embodiment of the present invention, the description of the partial targets and the linkage with the appertaining segments in the graph are combined with the aid of the MultiDest Index List and the MultiDest Description List that are linked to each other, which is also denoted as a MultiDest List.

In this context, all the partial targets are included in the MultiDest Index List. This MultiDest Index List includes no sorting, and is used only to make possible a simple access to the list of the segments that describe the partial target, as may be seen from the exemplary construction of the so-called MultiDest Index List shown below:

| MultiDest Index | Status/Description      |
|-----------------|-------------------------|
| 1               | /name of partial target |
| 2               | /name of partial target |
| 3               | /name of partial target |
| ...             | /name of partial target |
| N – 1           | /name of partial target |

Figure 11:
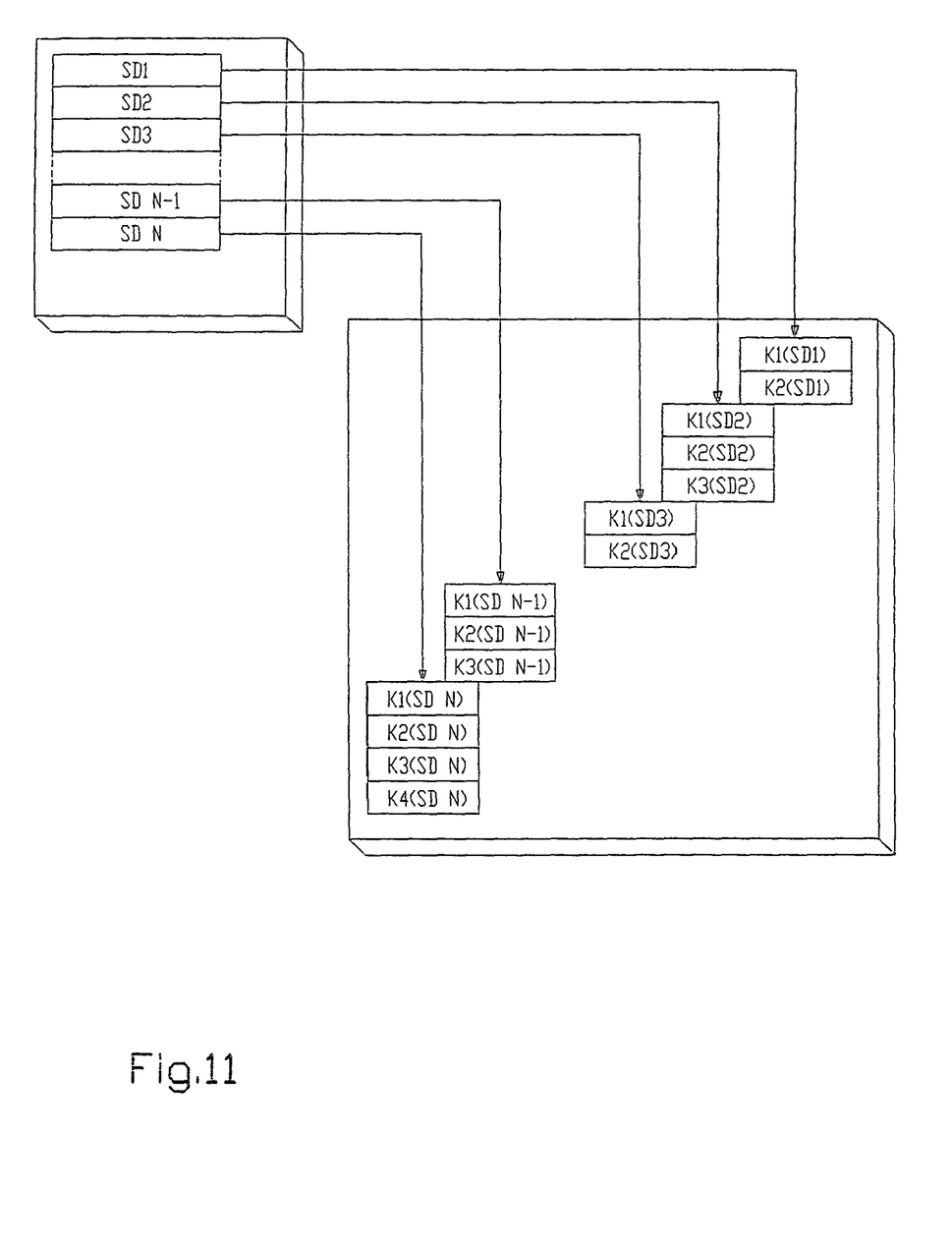
FIG. 11 shows a connection between the MultiDest Index List and the MultiDest Description List.

For each partial target (so-called subdestination SD), in the so-called MultiDest Index List illustrated at the top left of FIG. 11, a reference to the list of segments K appertaining to the respective subdestinations SD (shown in FIG. 11, bottom right, in the MultiDest Description List) is stored; FIG. 11, therefore, illustrates the connection between the MultiDest Index List and the MultiDest Description List.

A first list of the already optimized segments may be used for storing the already optimized segments. A second list is used for storing the segments to be tested in the next optimization step, and accordingly it expediently includes the segments to be tested in the next optimization step; at the beginning of the iterative optimization, the second list is empty. In this connection, the segments are derived that are to be tested in the next optimization step, as in already-discussed optimization relationships, beginning from an actual segment, all arriver segments are tested again.

In summary, one may determine that the present invention makes it possible to ascertain the optimal route from an actual position to one of a plurality of targets that are not connected and have equal rights. In this case, there is no sequential determination to the individual, possible targets; rather, the route is ascertained as the optimal route within the scope of the so-called MultiDestination RS method, taking into consideration all targets that come into consideration.

This yields the advantage that the driver of the vehicle achieves the best target point with the aid of optimal route guidance. That is, unfavorable route guidances, that are able to appear in the case of the exclusive choice of the nearest target, are avoided, because all targets are considered.

In addition, with regard to the present invention, one skilled in the art will appreciate that it is not limited to the use of one particular route search algorithm; to be sure, the above exemplified route search algorithm according to Ford and Moore is distinctly suitable for the present invention, but the method may also be implemented using other mathematically exact methods to ascertain the "best path" stemming from graph theory.

As was explained before, in the method introduced here, all targets are considered simultaneously, so that the determination of the optimal route to the best target takes place at one time, which, in turn, brings with it a more rapid calculation of the route than would be true in the sequential ascertainment. In this connection, a permanent optimization of the route and the best target from the current actual position takes place, that is, when one leaves the route, a new optimal route to the best target is automatically determined. Since, in this renewed determination of the route, all targets are given consideration, the best target for this current actual position prevails; in this connection, the new target does not have to correspond to the previously utilized target.

Since, in the so-called MultiDestination RS, all targets are considered that come into consideration, the optimal route to the optimal target is always available. Consequently, at every point in time, the respective distance to the current target as well as the remaining travel time or even the estimated arrival time may be stated. Independently of, or in conjunction with this, a combination having various route criteria can be made; thus the method according to the present invention may be used while considering the most varied optimization criteria, such as "short route" or "fast route". Besides the optimization criteria, the method may also be combined with various network manipulations, such as, for instance, telematics or manual blockages.

It should also be pointed out that the present method of the so-called MultiDestination RS may quite simply be integrated into intermediate target or so-called "ViaArea" route search methods, so that the specific characteristics of these intermediate area or "ViaArea" route search methods can be used; thus, for example, one could cite in this connection the complete description of the route to the actual target via "ViaArea".

In addition, according to the present invention, telematics service providers may dynamically inject targets in order, for example, to steer the traffic flow. In this connection, the navigation system in the vehicle remains fully autonomous, and is able to react autonomously and rapidly to the departure of the driver of the vehicle from the route. In contrast to this, such rapid reaction times cannot be achieved using methods in which a telematics service provider fully takes over the route calculation and downloads the route course into the vehicle.

Finally, the present invention relates to the use of the method explained above in a vehicle, especially in a navigation system of a vehicle.

Alternatively, or in addition, the above-explained method may also be used in a particularly software-based route search application of an electronic data processing set-up, particularly of a personal computer (PC) as a PC tool. Thereby the user of the electronic data processing set-up is put in the position, for instance, of testing the advised route for at least one traffic-related event, such as at least one road blockage, at least one traffic jam or traffic coming to a stop and/or at least one traffic accident. If necessary, the user of the electronic data processing set-up may have an alternative route or an evasive route determined and displayed for himself.

The use of the above-explained method is also possible to the effect that a service provider calculates an expediently optimized route, when requested by the user, with the aid of an electronic data processing set-up, and transmits the route thus ascertained by remote data transmission to the vehicle, especially to the motor vehicle of the user.

DETAILED DESCRIPTION

In the present exemplary embodiment of a method for ascertaining routes, the route network as shown in FIG. 1 is used to illustrate the principles of the present invention. In FIG. 1, segments k1, k3, k4, k6 and k9 each have the resistance value 10, and segments k2, k5, k7 and k8 each have the resistance value 20. At the time of consideration, the vehicle is located on segment +k8 (the "+" sign symbolizes that the travel direction corresponds to a preferred direction). The partial targets that are independent but have equal rights represent segment kg for partial target A, and represent segment k4 for partial target B.

After the definition of the two partial targets A and B (method step (R.2) in FIGS. 8 and 9), the following MultiDest Index List (see FIG. 11, top left) is derived:

| MultiDest Index | Status/Description |
|---|---|
| 1 | /partial target A |
| 2 | /partial target B |

In addition, after the definition of the two partial targets A and B, the following MultiDest Description List is derived (see FIG. 11, bottom right):

| MultiDest Index | Segment |
|---|---|
| 1 | +k1 |
| 1 | −k1 |
| 2 | +k4 |
| 2 | −k4 |

The procedure of the actual so-called "MultiDestination Route Search" begins with the initiation of the route table (see method steps R.3.1) in FIG. 9); in this connection, for each entry, the resistance is set to "infinite" (¢) and the successor segment (="successor") is set to "indefinite" (−), that is, the successor is deleted, so that the following basically initiated route table is derived:

| Segment | +Resistance | +Successor | −Resistance | −Successor |
|---|---|---|---|---|
| k1 | ∞ | − | ∞ | − |
| k2 | ∞ | − | ∞ | − |
| k3 | ∞ | − | ∞ | − |
| k4 | ∞ | − | ∞ | − |
| k5 | ∞ | − | ∞ | − |
| k6 | ∞ | − | ∞ | − |
| k7 | ∞ | − | ∞ | − |
| k8 | ∞ | − | ∞ | − |
| k9 | ∞ | − | ∞ | − |

In a next method step (see method step (R.3.2) in FIG. 9) the initiation of the segments of partial targets A and B described in the MultiDest Description List occurs, that is, of the segments that come into consideration as targets. In this connection, the route table entries of the segments listed in the MultiDest Description List are initiated as targets. To do this, the resistance is set to "zero" and the successor is marked as "target". Furthermore, the segments are entered in the list of the segments to be optimized in the next method step, so that the following route table is derived:

| Segment | +Resistance | +Successor | −Resistance | −Successor |
|---|---|---|---|---|
| k1 | 0 | target | 0 | target |
| k2 | ∞ | − | ∞ | − |
| k3 | ∞ | − | ∞ | − |
| k4 | 0 | target | 0 | target |
| k5 | ∞ | − | ∞ | − |
| k6 | ∞ | − | ∞ | − |
| k7 | ∞ | − | ∞ | − |
| k8 | ∞ | − | ∞ | − |
| k9 | ∞ | − | ∞ | − |

Accordingly, the first list for storing the already optimized segments receives the following form:

+k1 −k1 +k4 −k4

Figure 12:
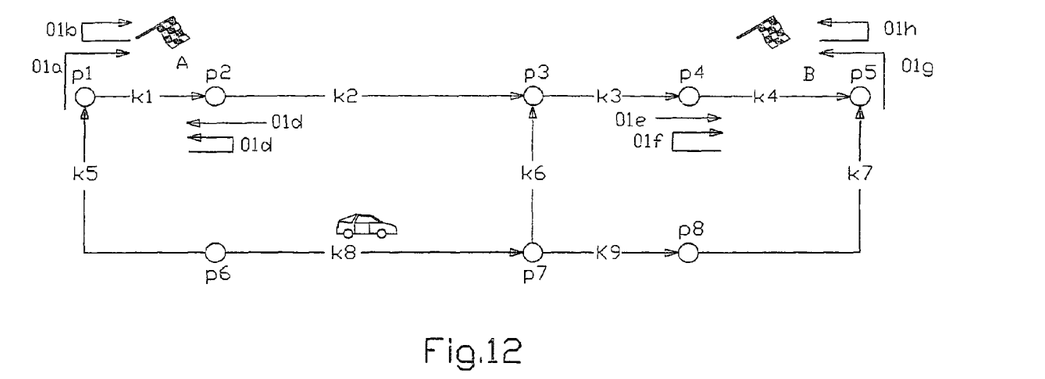
FIG. 12 shows a first optimization step in the light of the exemplary network as shown in FIG. 1.

At the subsequent method step of optimizing the segments of the graph allocated to the current section, the optimization conditions described in FIGS. 8 and 9 under method step (R.4) find application, and for the first optimization step (see FIG. 12), the following first list for storing the already optimized segments is the basis (see method step (B.6) in FIG. 9):

+k1 −k1 +k4 −k4

Figure 10:
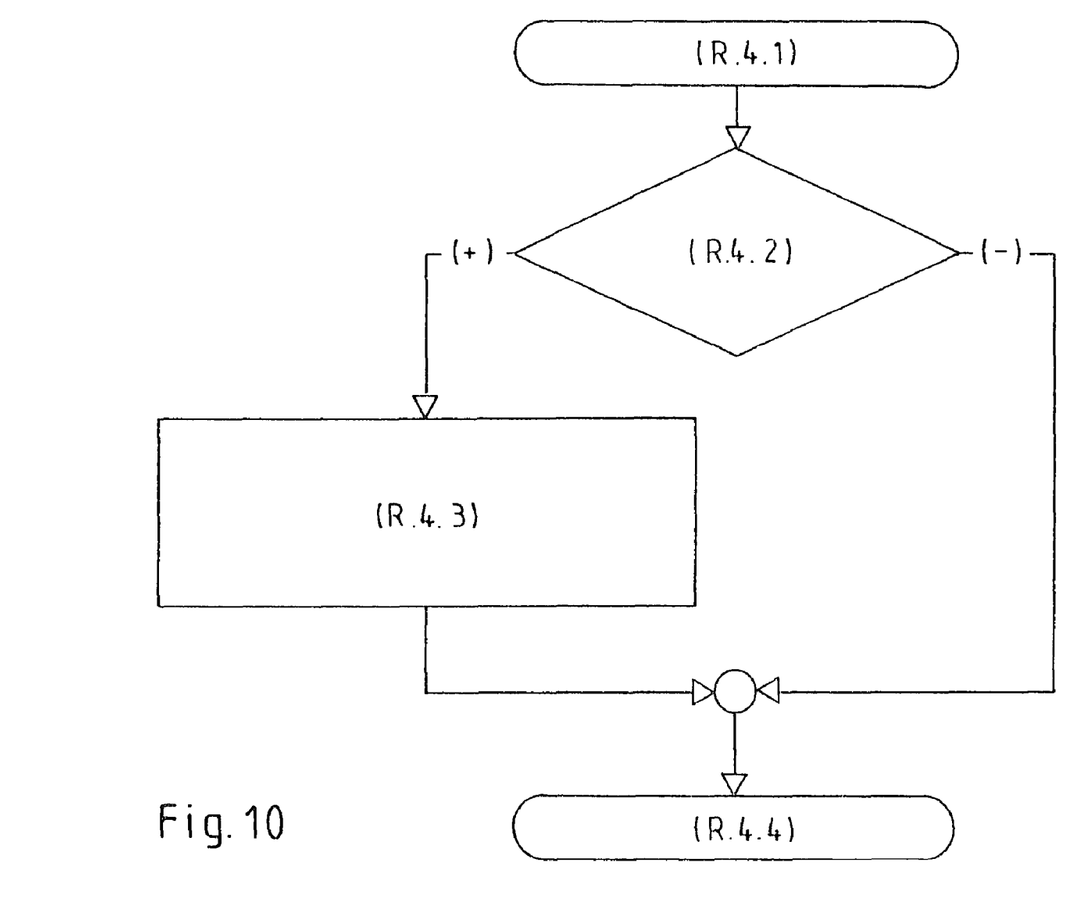
FIG. 10 shows a procedure of optimizing the route in the light of the optimization conditions or rules according to the present invention.

The first optimization step (see FIG. 12) is shown in the light of optimization O1a. For the arriver segment +k5 (see method step (B.8) in FIG. 9), there is derived from the segment value of this segment, and from the route table entry of the actual segment (see method step (B.7) in FIG. 9) the following new resistance value (see FIG. 10).

$$R_{RT(new),Ank(+k5)} = R_{segment,Ank(+k5)} + R_{RT,actual(+k1)}$$

$$R_{RT(new),Ank(+k5)} = 20 + 0$$

$$R_{RT(new),Ank(+k5)} = 20$$

The new resistance value of arriver segment +k5 is compared, corresponding to the optimization condition (R.4.2) explained with reference to FIG. 10, to the previous resistance value of this arriver segment +k5:

| $R_{RT(new),Ank(+k5)}$ | < | $R_{RT,actual(+k1)}$ |
|---|---|---|
| 20 | < | ∞ |

Therefore, the optimization condition is satisfied, so that the arriver segment +k5 is optimized. For this, the new resistance value and the successor (actual segment) are entered in the route table (see method step (R.4.3) in FIG. 10).

For the further optimizations O1b to O1h (see method steps (B.10) and B.11) in FIG. 9) an analogous procedure is valid, so that the route table gives the following picture after the conclusion of the first optimization step:

| Segment | +Resistance | +Successor | −Resistance | −Successor |
|---|---|---|---|---|
| k1 | 0 | target | 0 | target |
| k2 | ∞ | − | 20 | −k1 |
| k3 | 10 | +k4 | ∞ | − |
| k4 | 0 | target | 0 | target |
| k5 | 20 | +k1 | ∞ | − |
| k6 | ∞ | − | ∞ | − |
| k7 | 20 | −k4 | ∞ | − |
| k8 | ∞ | − | ∞ | − |
| k9 | ∞ | − | ∞ | − |

At the conclusion of the first optimization step, the first list for storing of the already optimized segments is empty.

Accordingly, the second list for storing the segments to be tested in the next method step says:

+k5 −k2 +k3 +k7

Thus, if all optimization relationships or optimization rules have been processed, the first list for storing the already optimized segments is empty (see method step (B.6) in FIG. 9), and in the second list for storing the segments to be tested in the next method step there are the segments optimized in this method step. These segments are used in the next method step as a starting basis for the optimization that then follows (see method step (B.12) in FIG. 9).

Starting from the results of this first optimization phase, some further optimization steps are performed, after the end of which there is no actual segment-arriver segment relationship left for which a successful optimization is derived, so that the second list for the storing of the segments to be tested in the next method step remains empty. At this point, the optimal paths from each segment to the best possible target have been described, so that the following route table is yielded after complete optimization of the. calculated field:

| Segment | +Resistance | +Successor | −Resistance | −Successor |
|---------|-------------|------------|-------------|------------|
| k1 | 0 | target | 0 | target |
| k2 | 40 | −k2 | 20 | −k1 |
| k3 | 10 | +k4 | 20 | +k3 |
| k4 | 0 | target | 0 | target |
| k5 | 20 | +k1 | 40 | +k5 |
| k6 | 20 | +k3 | 30 | +k6 |
| k7 | 20 | −k4 | 40 | +k7 |
| k8 | 40 | +k6 | 40 | +k5 |
| k9 | 30 | +k7 | 30 | +k6 |

At this point, the route list (see method step (R.5) in FIG. 8, 9) is drawn up, generated from the route table after the completed optimization. Starting from segment +k8 of the current position of the vehicle, the segments are written into the route list corresponding to the successor reference in the route table.

| Number | Segment | +Resistance to Target | Successor to Target |
|--------|---------|----------------------|---------------------|
| 1 | +k8 | 40 | +k6 |
| 2 | +k6 | 30 | +k3 |
| 3 | +k3 | 20 | +k4 |
| 4 | +k4 | 0 | |

Figure 13:
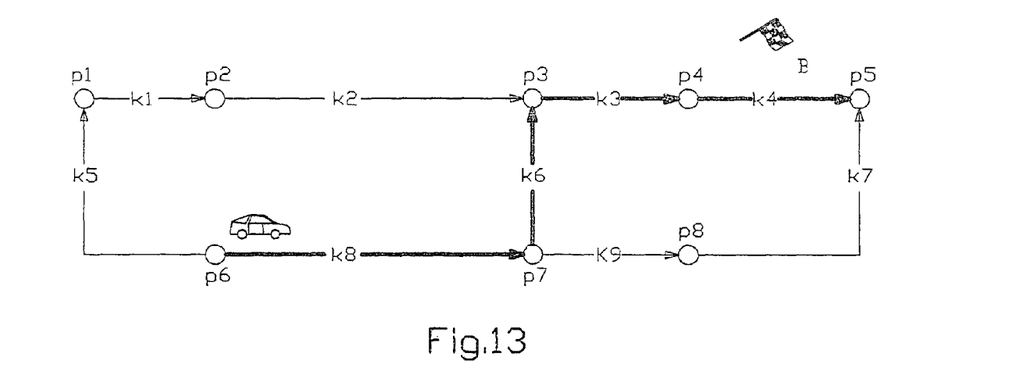
FIG. 13 shows a route of the vehicle from the current position to optimal partial target B in the exemplary network as shown in FIG. 1.

In this connection, the current partial target can be determined with the aid of the last segment in this route list, via the MultiDest Description List (see FIG. 11, bottom right). In the present case it is, with segment k4, the partial target having MultiDest Index 2, and with the aid of the MultiDest Index List, using this MultiDest Index, additional information such as the description or the name being able to be ascertained, so that in the result, by using a conventional route search, the partial target B can specified (see FIG. 13 on the corresponding route from current position +k8 to optimal partial target B).

Figure 14:
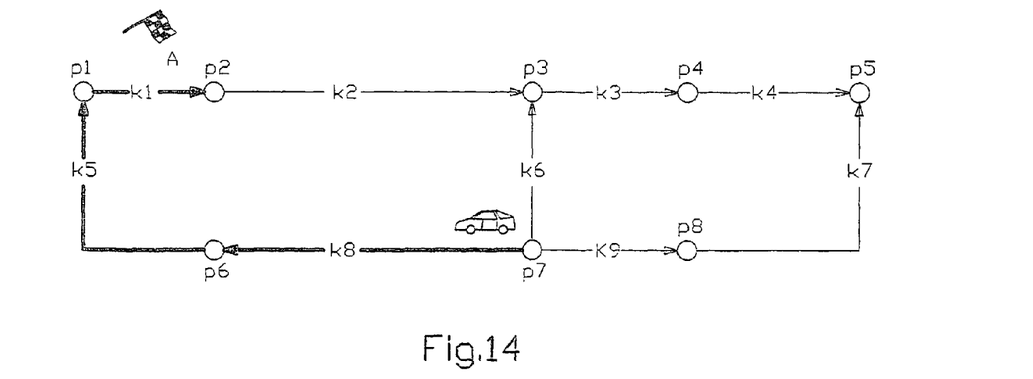
FIG. 14 shows the route of the vehicle from the current position to optimal partial target A in the exemplary network as shown in FIG. 1.

If this specifying of the optimal partial target does not occur, the additional partial targets remain active, so that by external influences on the route network, such as telematics, or because of deviating from the optimal route, another optimal path to a better partial target is derived. In this case, by deviating from +k8 to −k8, the following route list is derived (the corresponding route from current position −k8 to optimal partial target A in FIG. 14 being shown):

| Number | Segment | +Resistance to Target | Successor to Target |
|--------|---------|----------------------|---------------------|
| 1 | −k8 | 40 | +k5 |
| 2 | +k5 | 20 | +k1 |
| 3 | +k1 | 0 | |

In summary, it may therefore be determined that, in accordance with the present invention, the optimal route from the current actual position to the best target may be determined.

Furthermore, a plurality of targets that are independent of one another and are not contiguous but have equal reason to be specified, are also specified, wherein the optimally-reached partial target that is used is not located prior to the determination of the route. In this connection, the partial targets used may be composed of free targets or they may originate from a list of one category, in particular of a special target category, of the index.

Figure 15:
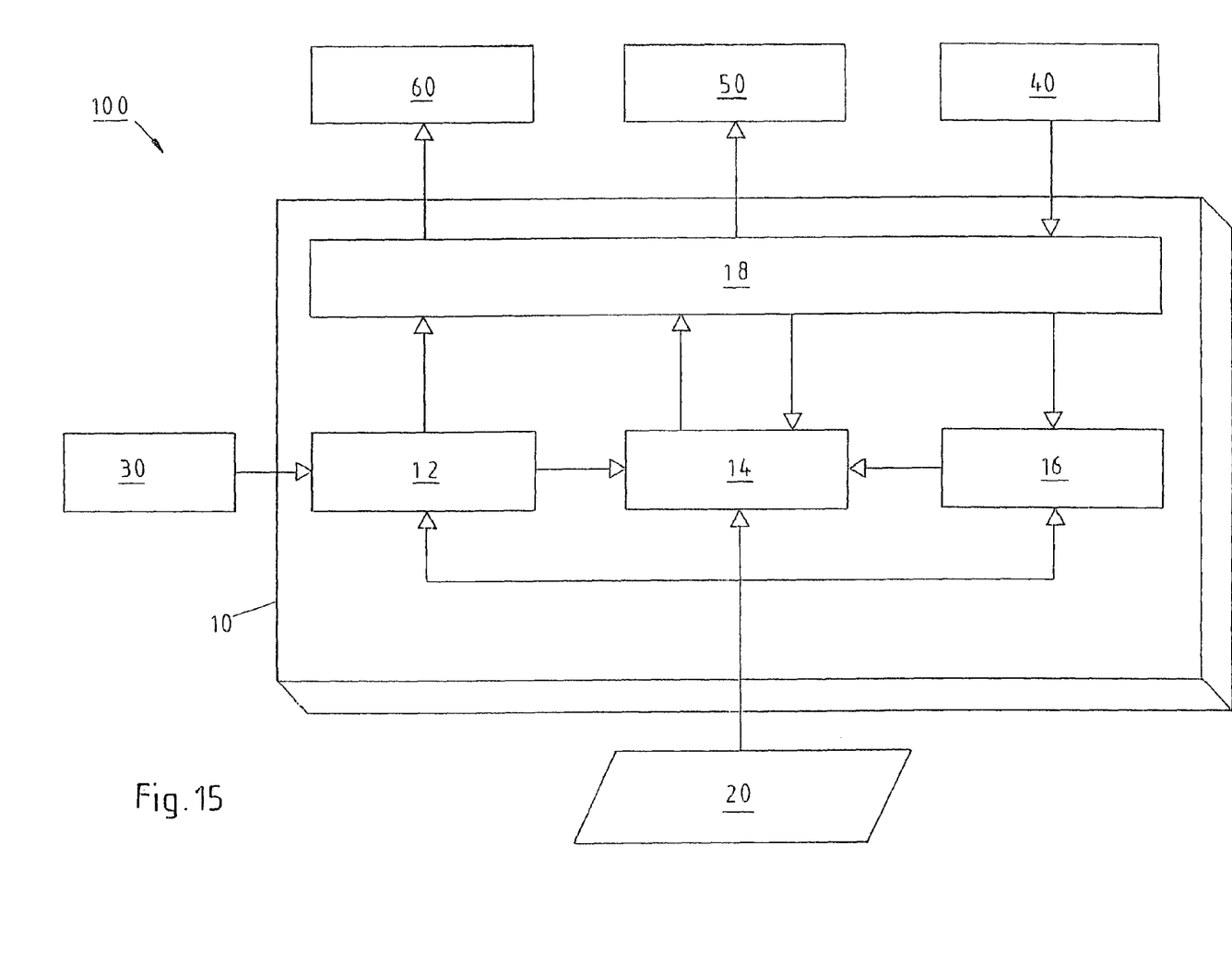
FIG. 15 shows in schematic representation, an exemplary embodiment of a navigation system according to the present invention.

With regard to the present invention, one skilled in the art will appreciate that the present exemplary embodiment is provided for use in a navigation system 100 of a motor vehicle, as illustrated in FIG. 15. The vehicle includes a processing unit 10 for carrying out the method explained above. To this processing unit 10 is allocated a memory unit 20 designed as a mass data memory (digital map), for imaging the road network as directed segments k and nodes p situated between the directed segments k; in addition, a sensor unit 30 is allocated to processing unit 10 for recording the current position of the motor vehicle.

In order to locate the current position of the vehicle, processing unit 10 has a position-finding unit 12, that is in contact with sensor unit 30; for determining that route which has the minimum resistance sum, processing unit 10 has a route search unit 14 that is in contact with position-finding unit 12 and with memory unit 20.

In addition, it is a feature of navigation system 100 that processing unit 10 has an index unit 16 that is in connection with route search unit 14 and with memory unit 20, for defining and specifying various target points from various entries
- of a plurality of indices of given addresses, map targets, target memory entries or the like, and
- of a plurality of indices of a given category, in each case, a given special target category such as, for example, post offices, gas stations or the like.

Via an interface 18 that is in connection with position finding unit 12, with route search unit 14 and with index unit 16, processing unit 10 is in connection with an input unit 40 for inputting the various above-explained target points. In this connection, input unit 40 is designed both for user-defined manual inputs and for automatic inputs, the automatic inputs being based on the automatic determination of the current vehicle position. As an example, one may, perhaps, work with the residual travel that is still available in view of the current tank charge, so that, in this case, the route search refers to the determination of gas stations that come into consideration as potential target points.

According to the present invention, the route search may also be designed as at least one MultiDestination RS; in the case explained of gas stations as potential target points, in the MultiDestination RS, a plurality of possible routes from the point of departure (from a current vehicle position) are calculated to a plurality or multiplicity of possible, spatially separated target points (gas stations still able to be reached with the current tank charge).

In addition, processing unit 10 has allocated to it an indicating or display unit 50 that is connected to interface unit 18 for optically representing the calculated route, as well as a loudspeaker unit 60 that is in connection with interface unit 18, for the acoustical representation of the calculated route.

The invention claimed is:
1. A method for calculating and displaying, using a computer-controlled vehicle navigation system, an optimal route from a point of origin to an optimal final destination target point selected from a plurality of spatially separated final destination target points that are allocated in each case to at least one of a directed segment and a node, in a route network mapped in a memory unit as directed segments and nodes situated between the directed segments, the method comprising:

using a computer controlled navigation system to perform the following:

allocating a resistance value to each directed segment and each node;

defining final destination target points by at least one of an index and a category;

optimizing the respective route to each of the plurality of spatially separated final destination target points simultaneously as a sequence of directed segments using a stepwise backwards iterating route search algorithm, wherein in each iteration step, a route to each of the final destination target points is optimized such that the respective resistance sum for each route representing the sum of resistances of the sequence of directed segments to the respective final destination target point becomes a minimum, wherein the optimizing of the respective route to each of the plurality of spatially separated final destination target points simultaneously results in a route having a minimum sum of resistances, and wherein the route having a minimum sum of resistances represents the optimal route to the optimal final destination target point;

drawing up a list of the respective route segments to the respective optimal final destination target point;

displaying on a display of the navigation system the route having the minimum sum of resistances as the optimal route, after drawing up the list of the respective route segments to the respective optimal final destination target point; and presenting to a user of the vehicle navigation system the following three options: (1) retaining the optimal final destination target point and discarding other final destination target points, (2) discarding the optimal final destination target point and determining a route to another final destination target point, or (3) retaining all final destination target points so that a better route may be derived when departing from the optimal route.

2. The method of claim 1, wherein the step of defining final destination target points by at least one of an index and a category includes the steps of:

initiating a MultiDest List;

selecting a certain target using at least one of an address, a map target, and a target memory entry;

copying a description of this target into the MultiDest List;

selecting at least one additional target; and copying a description of the at least one additional target into the MultiDest List.

3. The method of claim 1, wherein the step of defining final destination target points by at least one of an index and a category includes the steps of:

selecting the category;

determining whether a list of the category has been assigned as a MultiDest List;

if the list has been assigned as the MultiDest List, then:
initiating the MultiDest List;
copying target descriptions into the MultiDest List; and
processing at least a selected number of the targets;

if the list has not been assigned as the MultiDest List, selecting a targets.

4. The method of claim 1, wherein the target points are defined with at least one of:
i) user-specified manual input; and
ii) automatic input from entries including at least one of addresses, map targets, and target memory entries given by at least one index.

5. The method of claim 4, further comprising:
in the case of the automatic input, automatically determining a respective current location of the vehicle.

6. The method of claim 1, wherein the step of optimizing the respective route to each target point includes:
(1) setting up a route table, wherein for each directed segment, both in forward and backward direction, a resistance value and a successor segment is entered;
(2) setting all the resistance values of the route table to infinity and deleting all of the successor segments;
(3) setting the resistance values of segments allocated to the respective target points to zero;
(4) storing segments allocated to the respective target points in a first list for the segments that have already been optimized;
(5) setting up an empty second list for segments to be optimized in the next step;
(6) determining whether the first list is empty, wherein if the list is empty, ending the step of optimizing the respective route;
(7) if the first list is not empty, setting a segment from the first list as an actual segment;
(8) determining all the segments interconnected with the actual segment as arriver segments;
(9) determining for a respective arriver segment, whether an optimization condition is satisfied, wherein:
if the optimization condition is satisfied:
I) entering the respective arriver segment in the second list;
II) setting the resistance value of the respective arriver segment in the route table to a sum of a section resistance of the arriver segment and a resistance of the actual segment; and
III) entering the actual segment as the successor segment of the respective arriver segment;
if the optimization condition is not satisfied, discarding the arriver segment;
(10) determining whether all arriver segments have been processed, wherein:
if not all the arriver segments have been processed, then setting another segment from the first list as the actual segment and performing step (8); and
if all arriver segments have been processed, performing step (11);
(11) determining whether all segments from the first list have been processed:
if all segments from the first list have not yet been processed, performing step (7); and
if all segments from the first list have been processed, performing step (12);
(12) exchanging the first list with the second list, emptying the second list and performing step (6).

7. The method of claim 1, further comprising:
after ascertaining the optimal route from the point of origin to the respective optimal target point, one of the following is performed based on a choice of the user of the vehicle navigation system:
retaining the current target point and discarding other possible target points;
discarding the current target point and determining a route to one of the other possible target points; or maintaining all target points, and deriving a better route when deviating from the calculated route to another target point.

8. The method of 1, further comprising:
testing the calculated route for presence of factors influencing the route network by user-specified input or by telematics.

9. The method of claim 8, wherein the calculated route is modified by least one traffic-related event, the traffic-related event including one of a road closing, a traffic jam, traffic coming to a stop, and a traffic accident.

10. The method of claim 1, further comprising:
importing the drawn up list of respective routes to the respective target point into at least one navigation system with the aid of traffic telematics.

11. The method of claim 10, wherein the traffic telematics include at least one of GPRS, GSM, UMTS, and an online service provider.

12. The method of claim 1, wherein the method is performed in at least one of a vehicle, a software-based route search application of an electronic data processing system, and an electronic data processing system of a service provider.

13. A navigation system of a vehicle, comprising:
at least one processing unit configured to determine an optimal route from a point of origin to an optimal final destination target point selected from a plurality of spatially separated final destination target points that are allocated in each case to at least one of a directed segment and a nodes, the processing unit configured to perform:
allocating a resistance value to each directed segment and each node;
defining final destination target points by at least one of an index and a category;
optimizing the respective route to each of the plurality of spatially separated final destination target points simultaneously as a sequence of directed segments using a stepwise backwards iterating route search algorithm, wherein in each iteration step, a route to each of the final destination target points is optimized such that the respective resistance sum for each route representing the sum of resistances of the sequence of directed segments to the respective final destination target point becomes a minimum, wherein the optimizing of the respective route to each of the plurality of spatially separated final destination target points simultaneously results in a route having a minimum sum of resistances, and wherein the route having a minimum sum of resistances represents the optimal route to the optimal final destination target point;
drawing up a list of the respective route segments to the respective optimal final destination target point; and
allowing a choice of at least (1) retaining the optimal final destination target point and discarding other final destination target points, (2) discarding the optimal final destination target point and determining a route to another final destination target point, and (3) retaining all final destination target points so that a better route may be derived when departing from the optimal route.

* * * * *